United States Patent
Nam

(10) Patent No.: US 10,990,063 B2
(45) Date of Patent: Apr. 27, 2021

(54) APPARATUS FOR MEASURING QUALITY OF HOLOGRAPHIC DISPLAY AND HOLOGRAM MEASUREMENT PATTERN THEREOF

(71) Applicant: ELECTRONICS AND TELECOMMUNICATIONS RESEARCH INSTITUTE, Daejeon (KR)

(72) Inventor: Jeho Nam, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 77 days.

(21) Appl. No.: 16/552,988

(22) Filed: Aug. 27, 2019

(65) Prior Publication Data

US 2020/0319593 A1  Oct. 8, 2020

(30) Foreign Application Priority Data

Apr. 2, 2019 (KR) .................. 10-2019-0038459

(51) Int. Cl.
| | |
|---|---|
| *G01B 9/021* | (2006.01) |
| *G03H 1/22* | (2006.01) |
| *G06T 7/00* | (2017.01) |

(52) U.S. Cl.
CPC ......... *G03H 1/2202* (2013.01); *G03H 1/2294* (2013.01); *G06T 7/0002* (2013.01); *G03H 2001/2247* (2013.01); *G03H 2226/02* (2013.01); *G06T 2207/30168* (2013.01)

(58) Field of Classification Search
CPC .............. G03H 1/2202; G03H 1/2294; G03H 2001/2247; G03H 2226/02; G06T 7/0002; G06T 2207/30168
See application file for complete search history.

(56) References Cited

U.S. PATENT DOCUMENTS

| | | |
|---|---|---|
| 9,500,470 B2 | 11/2016 | Lee et al. |
| 2012/0008181 A1* | 1/2012 | Cable .................. G03H 1/2294 359/9 |
| 2014/0300941 A1 | 10/2014 | Chang et al. |
| 2016/0231706 A1 | 8/2016 | Oh |
| 2017/0154235 A1* | 6/2017 | Morard ................. G06T 7/0004 |

FOREIGN PATENT DOCUMENTS

| | | |
|---|---|---|
| KR | 20160019308 A | 2/2016 |
| KR | 101881755 B1 | 7/2018 |

* cited by examiner

*Primary Examiner* — Tarifur R Chowdhury
*Assistant Examiner* — Jonathon Cook

(57) ABSTRACT

The present description may provide a method of generating a hologram measurement pattern for measuring image quality of holographic display, including: generating a test pattern and a common pattern including at least one grayscale bar; generating measurement pattern data by combining the common pattern with a frame of the test pattern; and generating the hologram measurement pattern by inserting a random phase into the measurement pattern data and an apparatus applied thereto, thereby more accurately measuring the quality of the 3D holographic image reproduced by the holographic display.

18 Claims, 13 Drawing Sheets
(5 of 13 Drawing Sheet(s) Filed in Color)

APPARATUS FOR MEASURING QUALITY OF HOLOGRAPHIC DISPLAY AND HOLOGRAM MEASUREMENT PATTERN THEREOF

CROSS-REFERENCE TO RELATED APPLICATION

This application claims priority to and the benefit of Korean Patent Application No. 10-2019-0038459 filed in the Korean Intellectual Property Office on Apr. 2, 2019, the entire contents of which are incorporated herein by reference.

BACKGROUND OF THE INVENTION

(a) Field of the Invention

The present invention relates to an apparatus for measuring quality of a holographic display and hologram measurement pattern used for the quality measurement.

(b) Description of the Related Art

A holography technique is an ultimate 3D image reconstruction technique that can overcome limitations of image representation such as vergence-accommodation conflict caused by a stereo method according to the conventional art, by reproducing a 3D object in space and providing a natural three-dimensional image to a viewer.

Particularly, among such holography techniques, a digital holography technique is a technique that can reproduce stereoscopic images as if they existed in space by an optical display method for 3D information (e.g., amplitude and phase) related to 3D objects and real images based on a principle of optical diffraction and interference by using a photo-electronic device and a computer.

A holographic display for optically reconstructing a three-dimensional object is generally formed to include an optical system for providing optical functions, including a light modulator (SLM), a lens, a filter, etc., that spatially modulate coherent light.

In this case, reproduction performance of viewing angle and depth of the reconstructed holographic image is absolutely influenced by a pixel pitch of the spatial light modulator. In addition, a size of the reconstructed holographic image is directly related to SLM resolution and size. The brightness, gamut, sharpness, speckle, and the like of the reconstructed holographic image is affected by the performance of a coherent or partially coherent light emitting device such as a laser or a light emitting diode.

A recent digital holographic display has a very limited viewing angle due to the performance limitations of the spatial light modulator as a key element. The pixel pitch of the spatial light modulator of the holographic display is required to be very small at about 0.35 µm in order to obtain a viewing angle of 60° or more that is provided by a typical TV or display.

However, the spatial light modulator used in a recent beam projector technique has a horizontal pixel pitch or a vertical pixel pitch of about 8 µm, and when used as a holographic display, provides a very narrow viewing angle of about 2°.

SUMMARY OF THE INVENTION

The present invention has been made in an effort to provide a method and an apparatus for generating a hologram measurement pattern which is capable of overcoming performance limitations of a light measurement device for a holographic display.

An exemplary embodiment provides a method for generating a hologram measurement pattern for measuring image quality of a holographic display. The method includes: generating a test pattern and a common pattern including at least one grayscale bar; generating measurement pattern data by combining the common pattern with a frame of the test pattern; and generating the hologram measurement pattern by inserting a random phase into the measurement pattern data.

The at least one grayscale bar may be one of a red grayscale bar, a green grayscale bar, a blue grayscale bar, and white grayscale bar.

The generating of the common pattern including at least one grayscale bar may include assigning a three-dimensional (3D) depth value to each grayscale step of the at least one grayscale bar.

The grayscale step of the at least one grayscale bar may be represented by a color filled with a predetermined concentration within a rectangular area, a circle, a polygon, or a cross.

The test pattern may be one of a distortion evaluation test pattern, a modulation transfer function (MTF) measurement pattern, a color chart pattern, and a full-screen white pattern.

The generating the hologram measurement pattern by inserting a random phase into the measurement pattern data may include: inserting the random phase into the measurement pattern data and converting the measurement pattern data in which the random phase is inserted into a hologram pattern by a computer generated hologram (CGH) generation method; and determining a hologram pattern having a minimum difference between a hologram reconstructed image of the hologram pattern and the measurement pattern data as the hologram measurement pattern.

The method may further include: converting the hologram measurement pattern into a format of a hologram image file; and measuring quality of the holographic display by uploading the holographic image file to a spatial light modulator.

The converting the hologram measurement pattern into a format of a hologram image file may include converting a real number value of a pixel of the hologram measurement pattern into an integer value by performing quantization and normalization on the hologram measurement pattern.

The format of the hologram image file may be one of jpg, bmp, png, tif, and tiff.

Another exemplary embodiment provides an apparatus for generating a hologram measurement pattern for measuring image quality of a holographic display. The apparatus includes: a test pattern generator configured to generate a test pattern; a common pattern generator configured to generate a common pattern including at least two grayscale bar; a measurement pattern combiner configured to generate measurement pattern data by combining the common pattern with a frame of the test pattern; and a measurement pattern computer generated hologram (CGH) generator configured to generate the hologram measurement pattern by inserting a random phase into the measurement pattern data.

The at least two grayscale bar may include a white grayscale bar, and further includes one of a red grayscale bar, a green grayscale bar, and a blue grayscale bar.

When the measurement pattern combiner generate the measurement pattern data, the measurement pattern combiner may combine the white grayscale bar above the test pattern, and combine one of the red grayscale bar, the green grayscale bar, and the blue grayscale bar below the test pattern.

When the common pattern generator generates the common pattern including at least one grayscale bar, the common pattern generator may assign a three-dimensional (3D) depth value to each grayscale step of the at least two grayscale bar.

When the test pattern generator generates the test pattern, the test pattern generator may generate one of a distortion evaluation test pattern, a modulation transfer function (MTF) measurement pattern, a color chart pattern, and a full-screen white pattern as the test pattern.

The measurement pattern CGH generator may include: a random phase inserting processor configured to insert the random phase into the measurement pattern data; a CGH generator configured to convert the measurement pattern data in which the random phase is inserted into a hologram pattern by a computer generated hologram (CGH) generation method; and a pattern uniformity verification processor configured to determine a hologram pattern having a minimum difference between a hologram reconstructed image of the hologram pattern and the measurement pattern data as the hologram measurement pattern.

Yet another exemplary embodiment provides an apparatus for measuring quality of a holographic display. The apparatus includes: a memory configured to store a program; a processor configured to execute the program to perform: generating measurement pattern data by combining a test pattern with a common pattern including at least two grayscale bar outside the test pattern; and generating a hologram measurement pattern by inserting a random phase into the measurement pattern data; and a light measurement device (LMD) configured to measure the quality of the holographic display from a hologram reconstructed image of the hologram measurement pattern.

The processor may be configured to execute the program to further perform converting a real number value of a pixel of the hologram measurement pattern into an integer value by performing quantization and normalization on the hologram measurement pattern, wherein the integer value is mapped to each pixel in an image file corresponding to the hologram measurement pattern.

A format of the image file may be one of jpg, bmp, png, tif, and tiff.

The patent or application file contains at least one drawing executed in color. Copies of this patent or patent application publication with color drawing(s) will be provided by the Office upon request and payment of the necessary fee.

DETAILED DESCRIPTION OF THE EMBODIMENTS

Figure 1:
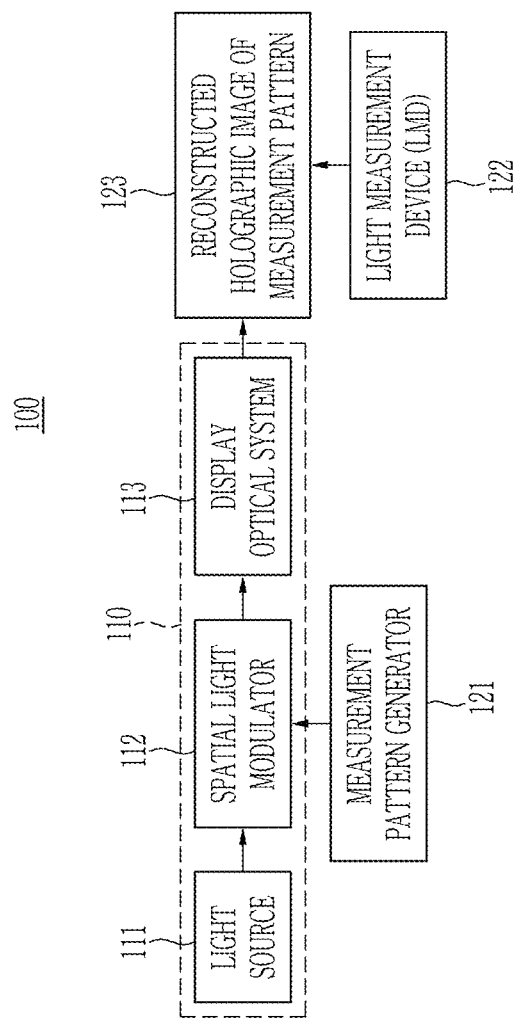
FIG. 1 illustrates a block diagram of a holographic display and an image quality evaluation apparatus according to an exemplary embodiment.

In the following detailed description, only certain exemplary embodiments have been shown and described, simply by way of illustration. As those skilled in the art would realize, the described embodiments may be modified in various different ways, all without departing from the spirit or scope. Accordingly, the drawings and description are to be regarded as illustrative in nature and not restrictive. Like reference numerals designate like elements throughout the specification.

In order to measure and evaluate various performance factors of the holographic display such as the size, brightness, color, sharpness, viewing angle, and reproduction depth of the reconstructed holographic image reproduced by the holographic display, it is necessary to use appropriate and effective test patterns that are specific to the corresponding performance factors.

In particular, it differs from the principle and concept of a display according to the conventional art, such as a 2D display or a binocular stereo display, and a multipoint display, and the holographic display that reproduces a 3D object in space based on the principle of diffraction and interference as a wave-optical phenomenon uses holographic image data having a 3D image form as a test pattern.

A performance measurement test pattern of a holographic display is manufactured by a computer generated hologram (CGH) method.

Complex amplitude R(u,v) of a reference wave for reproducing a hologram may be expressed by the following Equation 1.

$$O(u, v) = \sum_{i=0}^{N-1} a_i(x, y, z) \exp[j(kr + \phi_i)] \quad \text{(Equation 1)}$$

Complex amplitude O(u,v) of an object wave for reproducing a hologram may be expressed by the following Equation 2.

$$R(u,v) = \alpha_R \exp[-jkv \sin \theta_r] \quad \text{(Equation 2)}$$

In Equation 1 and Equation 2, $\alpha_i(x, y, z)$ indicates a size of the object wave in space coordinates (x, y, and z) of the object, $\phi_i$ indicates an initial phase difference between the object wave and the reference wave, N indicates a number of reflected light sources of the object, k indicates a wave number $(2\pi/\lambda)$, and $\lambda$ indicates a wavelength of the light source.

In Equation 1 and Equation 2, r indicates a distance between the reflected light source (x, y, and z) of the object and one coordinate (u, v) of a hologram plane. r may be defined as $\sqrt{(u-x)^2+(v-y)^2+z^2}$.

$\alpha_R$ indicates a magnitude of the reference wave, and $\emptyset_r$ indicates an angle at which the reference wave is incident.

A complex hologram generated by an interference phenomenon of the reference wave and the object wave may be represented using the following Equation 3.

$$H(u,v) = O(u,v) + R(u,v) \quad \text{(Equation 3)}$$

The intensity of the reproduced complex hologram may be represented by the following Equation 4.

$$\begin{aligned}I(u, v) &= |H(u, v)|^2 = |O(u, v) + R(u, v)|^2 \\ &= |O(u, v)|^2 + |R(u, v)|^2 + \\ &\quad O(u, v)R^*(u, v) + O^*(u, v)R(u, v)\end{aligned} \quad \text{(Equation 4)}$$

In Equation 4, a first term at a right side indicates a magnitude of the object wave, and a second term indicates a magnitude of the reference wave. Third and fourth terms contain a result of an interference phenomenon of two waves.

A fringe pattern, which is a result of the hologram, i.e., an interference phenomenon between the object wave and the reference wave, may be represented using the following Equation 5.

$$\begin{aligned}I_h(u, v) &= O(u, v)R^*(u, v) + O^*(u, v)R(u, v) \\ &= \sum_{i=0}^{N-1} \alpha_R a_i(x, y, z)\exp[j(kr + \emptyset_i + kv \sin\theta_r)] + \\ &\quad \sum_{i=0}^{N-1} \alpha_R a_i(x, y, z)\exp[-j(kr + \emptyset_i + kv \sin\theta_r)] \\ &= 2\alpha_R \sum_{i=0}^{N-1} a_i(x, y, z)\cos[kr + \emptyset_i + kv \sin\theta_r]\end{aligned} \quad \text{(Equation 5)}$$

As shown in Equation 5, the hologram $I_h(u, v)$ is calculated as an amplitude hologram used in an amplitude modulation SLM or a phase hologram used in a phase modulation dedicated SLM by selecting one of amplitude and phase components.

In Equation 5, both of the amplitude value and the phase value have a floating point number type of real values as in hologram $I_h(u, v)$, but is required to be converted and stored in the form of a digital image file format such as bmp, jpg, tif, or png in order to be uploaded to the amplitude or phase modulation type of SLM. The data of this digital image file is defined as having a bit-length of 8 bits per R, G, and B channel, and is represented by a non-negative integer having a value in a range of 0 to 255.

That is, quantization and normalization are required to convert real data to integer data as described above.

In this case, unlike image data used in a conventional display, a reference value corresponding to RGB=(255, 255, 255) corresponding to white may be required to be accurately set to calculate a relative light intensity value when data is stored in a separate file form, in order to determine a quantitative amplitude magnitude in a process of normalizing the light intensity reproduced in space by the holographic display.

In addition, a random phase is added into the hologram when the hologram is generated in order to compensate for the disadvantage that the viewing angle of the spatial light modulator according to the conventional art is very narrow due to a performance limit. The insertion of the random phase causes diffuse reflection of light in all the pixels of the reconstructed holographic image, so that the user may more easily observe the reconstructed holographic image.

However, the added random phase affects uniformity of the intensity of the measurement pattern, which hinders accurate measurement of the performance of the holographic display.

Particularly, there is a difficulty in a strict relative comparison evaluation due to a deviation according to the random phase when characteristic elements of the holographic display are subjected to comparative measurement and evaluation using a plurality of measurement patterns such as measurement of a modulation transfer function (MTF) depending on a spatial frequency variation and evaluation of color difference-based color fidelity.

For effective performance measurement and image quality evaluation of the holographic display, it is necessary to generate a holographic pattern for measuring the performance of the holographic display by a more accurate and systematic method, and to use automated means and techniques that are more advanced than the conventional art in order to solve problems of measurement uniformity caused by random phase addition and errors in the normalization process that occurs when a measurement holographic pattern is generated.

Hereinafter, a method and an apparatus capable of improving accuracy and reliability of measurement and evaluation of the holographic display by reflecting characteristic elements that are essential to a test holographic pattern that is necessary for performance measurement of the holographic display will be described with reference to FIG. 1 to FIG. 8 in order to solve the above-mentioned conventional problems.

FIG. 1 illustrates a block diagram of a holographic display and an image quality evaluation apparatus according to an exemplary embodiment.

A method for measuring performance and evaluation of image quality of a holographic graphic display according to the conventional art includes simply naked eye observation or measurement of optical characteristics using a measuring instrument for a hologram type of measurement pattern reproducing 2D or 3D images in space.

As described above, in the case of the measurement of optical characteristics, when the hologram of the measurement pattern is stored as data of a digital image file, a quantization error occurs in converting intensity and phase information of a complex optical field to a non-negative integer value. In addition, uniformity deterioration occurs due to the random phase inserted when the hologram is generated. This makes it difficult to form a hologram pattern that is necessary for accurate and effective measurement and evaluation.

The measurement pattern of the holographic display may be automatically generated and reflected in the measurement in order to improve the accuracy and reliability of measurement and evaluation for the holographic display.

As illustrated in FIG. 1, a holographic system 100 includes a digital holographic display 110, a measurement pattern generator 121, and a light measurement device 122.

The digital holographic display 110 includes a light source 111 for emitting light, a spatial light modulator 112 for modulating light, and a display optical system 113 for displaying the modulated light.

The measurement pattern generator 121 generates a measurement pattern that is essential for measuring performance and evaluating image quality for the digital holographic display. The light measurement device 122 includes a CCD sensor, an optical camera, a colorimeter, etc., to measure and evaluate performance of a holographic display system which measures optical characteristics of a reconstructed holographic image 123 from the measurement pattern.

Figure 2:
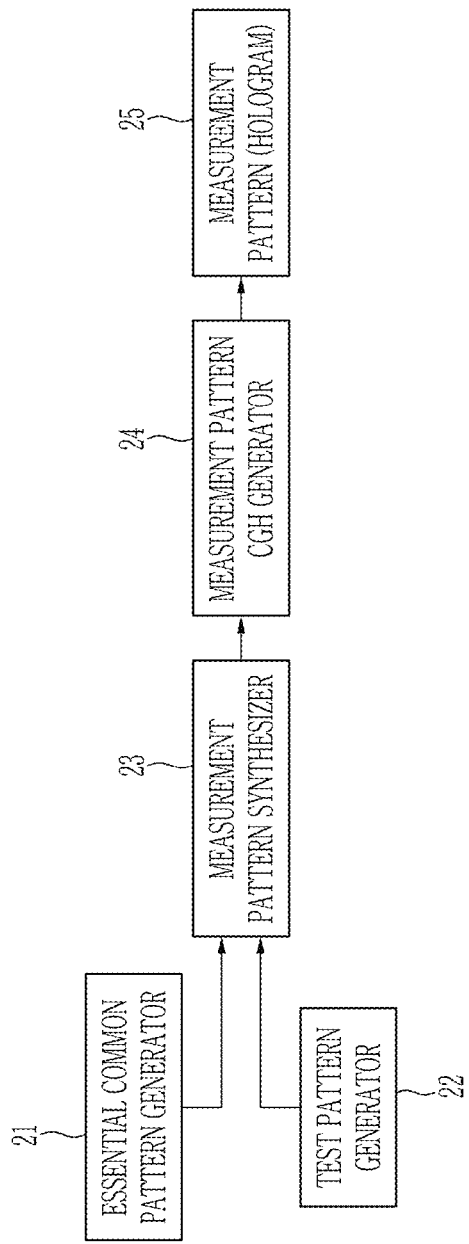
FIG. 2 illustrates a block diagram of a measurement pattern generator according to an exemplary embodiment.

FIG. 2 illustrates a block diagram of a measurement pattern generator according to an exemplary embodiment.

As illustrated in FIG. 2, the measurement pattern generator 121 of FIG. 1 includes a common pattern generator 21, a test pattern generator 22, a measurement pattern synthesizer 23, and a measurement pattern CGH generator 24 to generate a measurement pattern (hologram) 25.

The common pattern generating unit 21 generates a common pattern. The common pattern generator 21 is specialized in holography for the purpose of preventing the occurrence of errors in the normalization upon conversion into a hologram and generates a measurement pattern that is essential for holographic display measurement. The common pattern may be commonly used for measurement and evaluation of various performance items.

The test pattern generator 22 generates a test pattern. The test pattern generator 22 generates a test pattern used for measurement and evaluation of various performances of a display including holography. This will be described later.

The measurement pattern synthesizer 23 synthesizes the common pattern and the test pattern in a 2D or 3D space in a signal processing manner.

The measurement pattern CGH generator 24 converts the synthesized measurement pattern into a hologram measurement pattern through a computer-generated hologram (CGH) method, to optically reproduce the synthesized measurement pattern in the 3D space.

Figure 3:
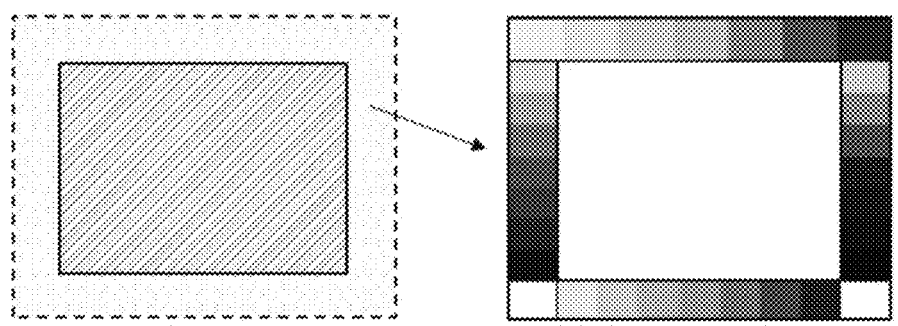
FIG. 3 illustrates a configuration of a measurement pattern according to an exemplary embodiment.
Figure 4:
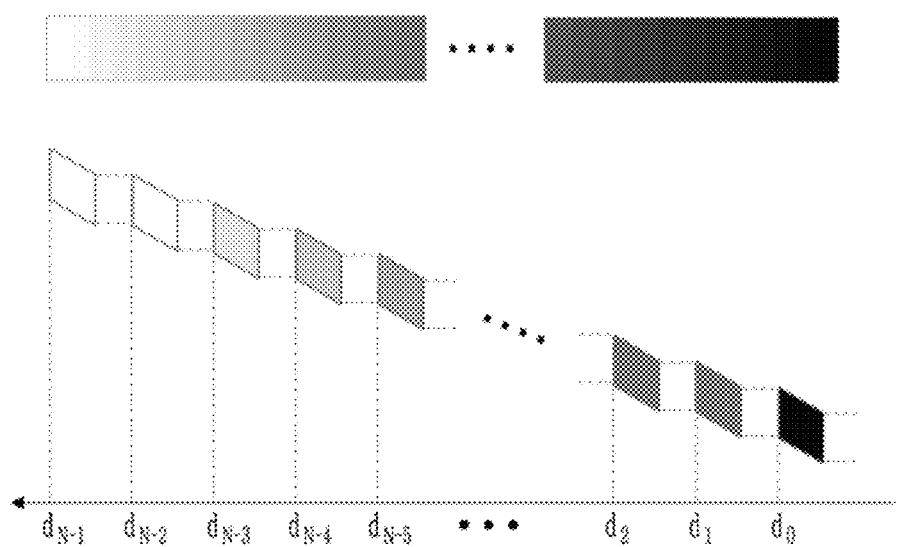
FIG. 4 illustrates a grayscale bar of the measurement pattern and a 3D depth mapped to each grayscale step of the grayscale bar of FIG. 3.
Figure 5:
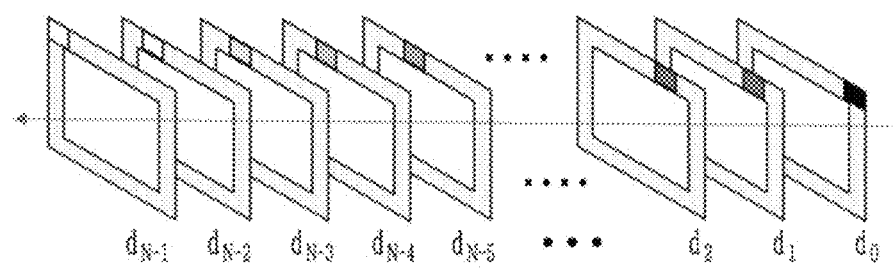
FIG. 5 illustrates a configuration depending on a 3D depth of a grayscale bar according to an exemplary embodiment.

FIG. 3 illustrates a configuration of a measurement pattern according to an exemplary embodiment, FIG. 4 illustrates a grayscale bar of the measurement pattern and a 3D depth mapped to each grayscale step of the grayscale bar of FIG. 3, and FIG. 5 illustrates a configuration depending on a 3D depth of a grayscale bar according to an exemplary embodiment.

Referring to FIG. 3, the common pattern generated by the common pattern generator of FIG. 2 may be arranged in a frame of the test pattern. In FIG. 3, the middle square indicated by the hatched line represents the test pattern, and the common pattern including four grayscale bars (RGBW) is located around the test pattern.

The common pattern generated by the common pattern generator may include gray scale grayscale bar and grayscale bars of three primary colors of light. The grayscale bars of the common pattern are respectively arranged at the four parts of the edges of the test pattern, and include the grayscale bars of white (upper side of FIG. 3), the grayscale bar of red (Left side of the rectangle in FIG. 3), the grayscale bar of green (bottom side of the rectangle in FIG. 3), and blue grayscale bar (right side of FIG. 3). The common pattern may include only some of the grayscale bars of the four grayscale bars. Referring to FIG. 3, each grayscale step of the grayscale bars is represented by a color filled with a predetermined concentration within a rectangular area. For example, in a red grayscale bar located on the left side, each grayscale step is represented by a red color of a predetermined concentration, filled in a rectangular box, and the concentration is thickened in the downward direction. In this case, each gradient level may be represented by a circle, a polygon, a cross, or the like instead of the rectangular box. For example, when the grayscale level is indicated by the circle, the grayscale bar may include a plurality of consecutive circles.

Each gradient step N of the RGBW (red, green, blue, and white) grayscale bars may be selected as one of 16, 32, 64, 128, and 256 depending on an application field thereof. Specifically, frame portions of the hologram measurement pattern are formed as holographic patterns of the RGBW grayscale bars. In this case, the hologram measurement pattern may have only a single depth plane that is optically reconstructed at a specific reproduction distance, and may be generated to be effective within a predetermined reconstruction distance in the 3D space according to the purpose of the measurement.

Figure 6A:
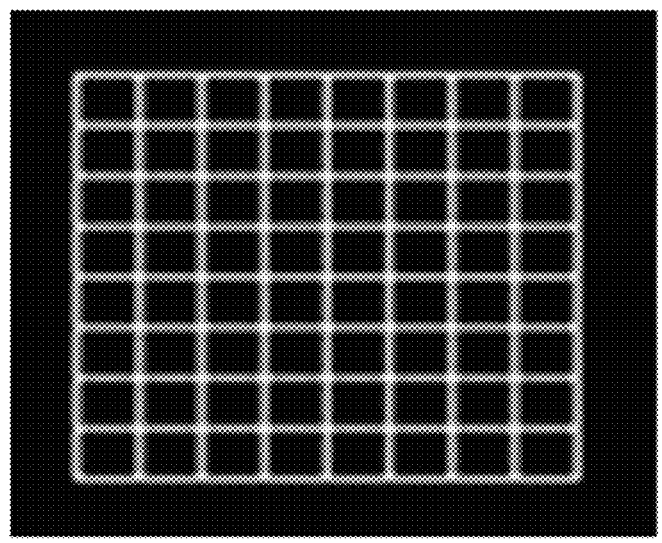
FIG. 6A to FIG. 6C illustrate examples of test patterns for measuring performance of a holographic display and evaluating image quality thereof according to an exemplary embodiment.
Figure 6B:
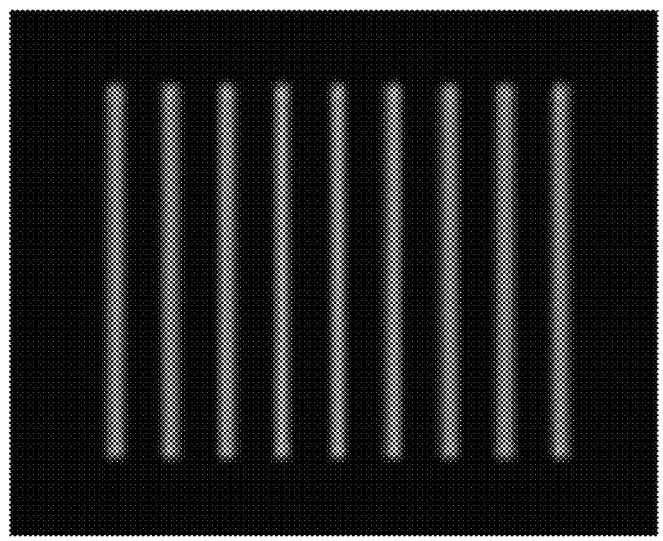

For example, the image quality evaluation apparatus for the holographic display may measure and evaluate depth reproduction performance of a holographic display by reproducing a modulation transfer function (MTF) measurement pattern of FIG. 6B in a depth-wise manner, i.e., depending on a focal distance, in order to measure and evaluate a resolving power, such as sharpness or contrast of the holographic display.

As illustrated in FIG. 4, the measurement pattern generator 121 may provide depth characteristics in a range of $d_0$, ..., and $d_{N-1}$ to the RGBW grayscale bars of FIG. 3 to generate the measurement pattern. The grayscale bars with which the depth characteristics is provided may be used to effectively measure and evaluate a 3D holographic characteristic.

When grayscale steps of the grayscale bar N=256, the measurement pattern generator 121 may designate a 3D depth value to the RGBW grayscale bars of the common pattern by mapping RGB=(255, 255, 255), which is the brightest grayscale level, to the longest distance of $d_{255}$, mapping RGB=(254, 254, 254) to the distance of $d_{254}$, ..., mapping RGB=(1, 1, 1) to the distance of $d_1$, and mapping RGB=(0, 0, 0) to the distance of $d_0$.

As illustrated in FIG. 5, by assigning the 3D depth value to the RGBW grayscale bars of the common pattern, the 3D depth may be reproduced as if the measurement pattern is distributed along the depth axis. Other grayscale bars (e.g., red, green, and blue grayscale bars) positioned at the frame of the measurement pattern may be assigned 3D depth value in a similar manner to the white grayscale bar.

By assigning the 3D depth values to the grayscale bars of the common pattern located at the outside the measurement pattern, when the holographic display is used to optically reconstruct the hologram of the 3D object according to the depth within a certain distance, the uniformity and feasibility can be identified and evaluated together.

Figure 6C:
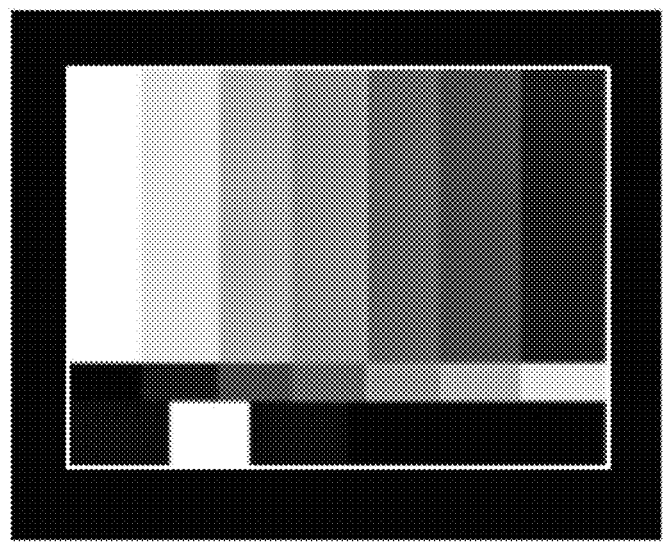

FIG. 6A to FIG. 6C illustrate examples of test patterns for measuring performance of a holographic display and evaluating image quality thereof according to an exemplary embodiment.

As illustrated in FIG. 2, the test pattern generator 22 may generate a test pattern to be combined in a portion surrounded by the grayscale bars of the common. A rectangular area, indicated by hatched, located in the center in the left side of FIG. 3 is one of the various display test patterns illustrated in FIG. 6.

For example, as illustrated in FIG. 6A, the test pattern may be a distortion evaluation test pattern for evaluating the geometric distortion that may occur when the holographic display performs optical reproduction.

As another example, as illustrated in FIG. 6B, the test pattern may be an MTF measurement pattern used to measure and evaluate the resolution of the holographic display.

As another example, as illustrated in FIG. 6C, the test pattern may be a color chart pattern used for measuring color reproduction performance of the holographic display.

As another example, the test pattern may be a full-screen white pattern used for measuring brightness (luminance) performance and flicker of the holographic display.

The measurement pattern synthesizer 23 of FIG. 2 may synthesize one of the various display test pattern with the common pattern including the at least one grayscale bar in the 2D or 3D space in a signal processing manner. When images of the test pattern are 3D information rather than 2D information, the test pattern may be expressed in various 3D information forms such as RGB and depth images, or a point-cloud, or a 3D mesh, and the synthesis process of the common pattern and the test pattern may be also treated in a suitable combination manner for the 3D information forms of the test pattern.

The measurement pattern CGH generator 24, through the CGH method, may generate 2D or 3D measurement pattern data obtained by synthesizing the display test pattern with the common pattern including the at least one RGBW grayscale bar as a hologram measurement pattern that can be optically reconstructed in a 3D space. Specifically, the measurement pattern CGH generator 24 may insert a random phase into the measurement pattern data when generating the hologram measurement pattern from the measurement pattern data in which the common pattern and the test pattern are combined. The insertion of the random phase is intended to compensate for the drawback that the viewing angle is very narrow due to the SLM performance limitations of holographic displays. However, inserting the random phase into the measurement pattern data may affect the uniformity of the measurement pattern intensity, which may hinder accurate performance measurement. A method for solving this problem will now be described with reference to FIG. 7.

Figure 7:
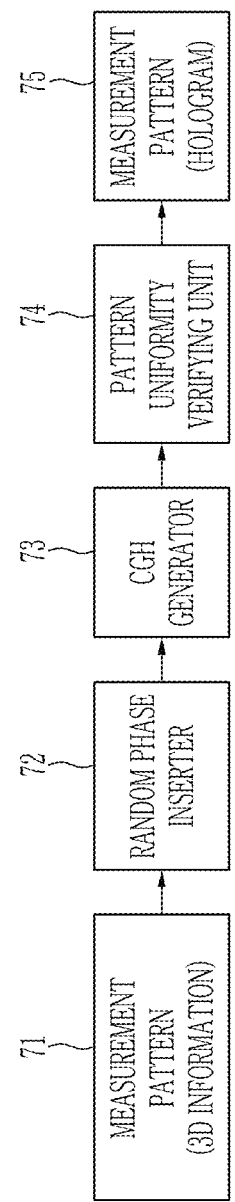
FIG. 7 illustrates a block diagram showing a process of inserting a random phase for a holographic pattern and an iterative method for uniformity verification according to an exemplary embodiment.

FIG. 7 illustrates a block diagram showing a process of inserting random phase for a holographic pattern and an iterative method for uniformity verification according to an exemplary embodiment.

In order to reduce the variation in the intensity of the complex light field that may occur when the random phase is inserted into the measurement pattern data, an iterative method for verifying the uniformity of the hologram measurement pattern 75 may be performed. Equation 6 below resents an iterative method for verifying the uniformity of the hologram measurement pattern 75. Through the iterative method for verifying the uniformity of the hologram measurement pattern 75, the hologram measurement pattern 75 in which an optimal random phase is inserted may be determined. Referring to Equation 6, after the insertion of the random phase into the measurement pattern data 71 (72) and the CGH generation for the measurement pattern data 71 (73) are repeated N times, the pattern uniformity processor 74 determines the hologram pattern having the minimum mean square error (MSE) between $R_i$ and $r(x_i)$ as the hologram measurement pattern $\hat{X}$ 75. In Equation 6, $x_i$ is a hologram pattern of the white grayscale bar in the hologram pattern generated by the insertion of the random phase (72) and the CGH generation (73), $R_i$ is the original image (i.e., a portion of the white grayscale bar of the measurement pattern input to the measurement pattern CGH generator 24) of the white grayscale bars corresponding to the $x_i$, and $r(x_i)$ is a hologram reconstruction image of the white grayscale bars calculated through numerical reconstruction. That is, referring to Equation 6, the hologram measurement pattern $\hat{X}$ 75 has a minimum error compared to the original. In other words, the result of Equation 6 may be a hologram measurement pattern determined to have an intensity value most similar to the original. Therefore, the hologram measurement pattern $\hat{X}$ has an intensity value most similar to the original white gradient, and the uniformity of the gradient step can be ensured.

$$\hat{x} = \arg\min_x \frac{1}{N} \sum_{i=1}^{N} (R_i - r(xi))^2 \qquad \text{(Equation 6)}$$

Figure 8A:
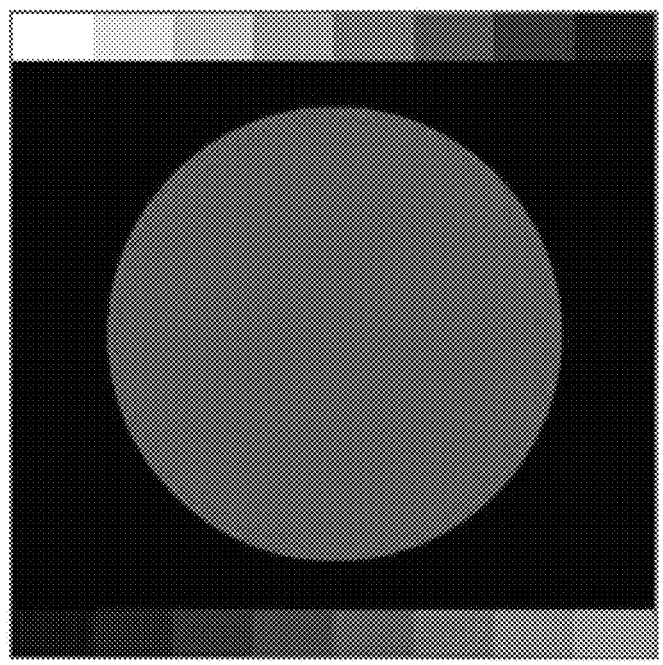
FIG. 8A to FIG. 8C illustrate a measurement pattern data and a hologram measurement pattern according to an exemplary embodiment.
Figure 8B:
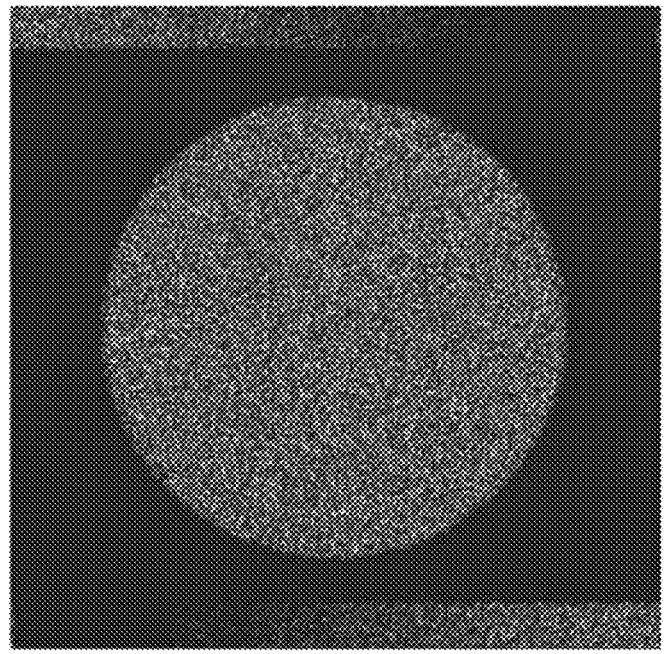
Figure 8C:
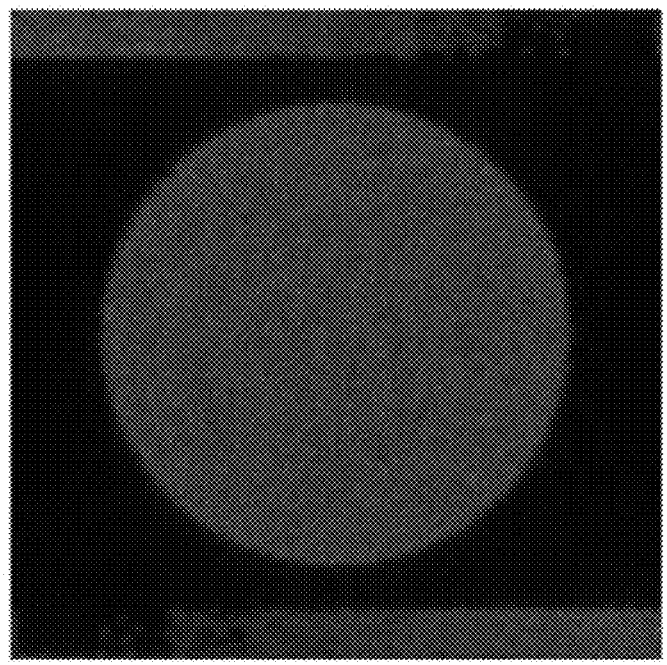

FIG. 8A to FIG. 8C illustrate the measurement pattern data and the hologram measurement pattern according to an exemplary embodiment.

Referring to FIG. 8A, a measurement pattern data includes a display test pattern having a circular shape and a common pattern including a green grayscale bar and a white grayscale bar. In FIG. 8A, a green grayscale bar is synthesized with the test pattern under the frame of the test pattern by the signal processing scheme, and white grayscale bar is synthesized with the test pattern on the edge of the test pattern, respectively.

FIG. 8B is an amplitude hologram measurement pattern in which the random phase is inserted into the measurement pattern data and the CGH generation is performed. In the amplitude hologram measurement pattern, significant noises are included in hologram intensity under the influence of the inserted random phase. FIG. 8C shows the result of the numerical reconstruction of the amplitude hologram measurement pattern of FIG. 8B. That is, based on Equation 6, the holographic measurement pattern showing the numerical result most similar to the original has been finally determined.

The hologram measurement pattern 75 is then converted into a holographic image file format so that it can be uploaded to the spatial light modulator 112 of the digital holographic display 110 shown in FIG. For example, the hologram measurement pattern 75 may be converted into an image file format such as jpg, bmp, png, or tif. When the hologram measurement pattern 75 is converted to an image file format, since each pixel of the image file has an integer value of 0 to 255, the amplitude and/or phase of the pixels of the hologram measurement pattern 75 are quantized and normalized. That is, since the amplitude or phase value of the hologram measurement pattern of the complex wave-field has a real number value of floating point number type, the measurement pattern generator according to an embodiment Reference numeral 121 performs quantization and normalization to convert a real value of a pixel of the hologram measurement pattern 75 into an integer value of a pixel of the image file. After the hologram measurement pattern is converted into a hologram image file and the hologram reconstruction image is reproduced by the display optical system 113, the optical measuring device 122 may measure the image quality of the holographic display from the hologram reconstruction image of the measurement pattern.

According to an exemplary embodiment, when the holographic display determines the quantitative magnitude of the light reproduced in space through normalization of the intensity of the light, the reference value corresponding to full-white (i.e., RGB=(255, 255, 255)) should be suitably set so that the relative intensity value of the light can be calculated accurately. According to the exemplary embodiment, the at least one grayscale bar of the common pattern, which is located at the edge of the measurement pattern, may serve as a reference for linear normalization within the dynamic range of the complex light field, and thus the error that may occur during the normalization process can be avoided.

As described above, according to the present description, since the common pattern including at least one grayscale bar is combined around the 2D or the 3D display test pattern, the errors which may occur when the holographic measurement pattern is stored in the image file format can be avoided, wherein the errors may be an error on the normalization process which may occur when the intensity of the dynamic complex optical field in the form of floating-point real number is converted to an integer value in the range [0, 255]. In addition, since the hologram measurement pattern is determined through an iterative method to have the minimum MSE, it is possible to effectively reduce the decrease in the intensity uniformity of the measurement pattern which may occur when adding a random phase to the hologram data. The accuracy and reliability of the measurement evaluation of the holographic display can be improved.

According to the exemplary embodiment, it is possible to more clearly express a 3D holographic image reproduced by the holographic display.

In addition, it is possible to ensure the uniformity of the measurement pattern for measuring the image quality of the hologram reproduced by the holographic display, thereby performing objective and accurate measurement of the hologram image.

In addition, it is possible to effectively reduce errors in the normalization process that may occur when converting and storing the hologram pattern generated by the CGH technique into a digital image file format that can be uploaded to the spatial light modulator and the pattern uniformity deterioration that may occur when a random phase is added into the hologram data.

Figure 9:
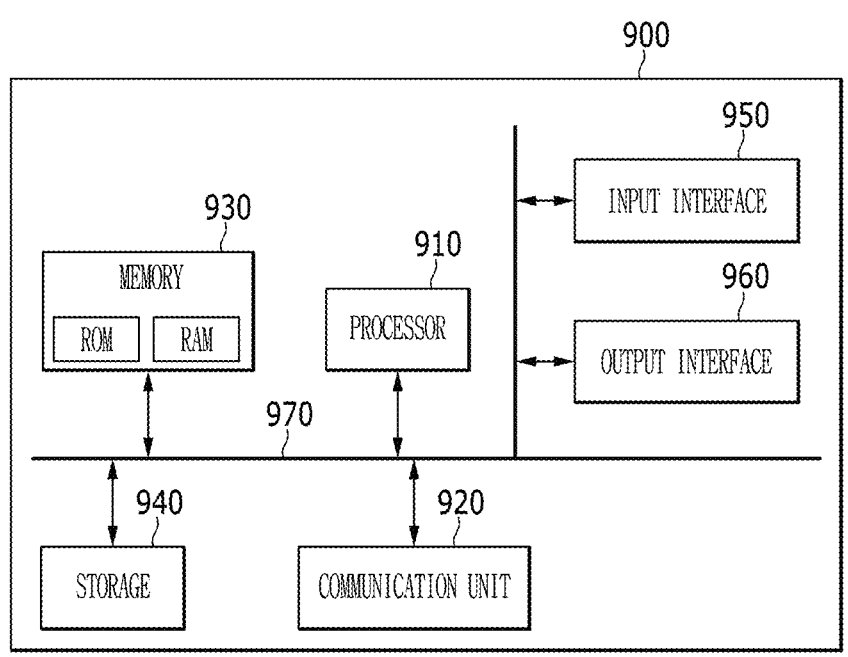
FIG. 9 is a block diagram illustrating a measurement pattern generator according to another exemplary embodiment.

FIG. 9 is a block diagram illustrating a measurement pattern generator according to another exemplary embodiment.

A measurement pattern generator according to the current exemplary embodiment may be implemented as a computer system, e.g., a computer readable medium. Referring to FIG. 9, the computer system 900 may include at least one of a processor 910 communicating via a bus 970, a memory 930, an input interface device 950, an output interface device 960, and storage 940. The computer system 900 also may include a communication device 920 coupled to the network. The processor 910 may be a central processing unit (CPU) or a semiconductor device that executes instructions stored in the memory 930 or the storage device 940. The memory 930 and the storage device 940 may include various forms of volatile or non-volatile storage media. For example, the memory 930 may include a read only memory (ROM) and a random access memory (RAM). In the exemplary embodiments of the present disclosure, the memory may be located inside or outside the processor, and the memory may be coupled to the processor through various means that are already known.

Thus, the exemplary embodiments may be implemented as a computer-implemented method or as a non-volatile computer-readable medium having computer-executable instructions stored thereon. In an exemplary embodiment, when executed by a processor, the computer-readable instructions may perform the method according to at least one aspect of the present disclosure.

Although the embodiments of the present invention have been described in detail above, the scope of the present invention is not limited thereto, and various modifications and improvements of those skilled in the art using the basic concepts of the present invention defined in the following claims are also provided. It belongs to the scope of rights.

What is claimed is:

1. A method for generating a hologram measurement pattern for measuring image quality of a holographic display, the method comprising:
   generating a test pattern and a common pattern including at least one grayscale bar;
   generating measurement pattern data by combining the common pattern with a frame of the test pattern; and
   generating the hologram measurement pattern by inserting a random phase into the measurement pattern data.

2. The method of claim 1, wherein
   the at least one grayscale bar is one of a red grayscale bar, a green grayscale bar, a blue grayscale bar, and white grayscale bar.

3. The method of claim 1, wherein the generating of the common pattern including at least one grayscale bar includes
   assigning a three-dimensional (3D) depth value to each grayscale step of the at least one grayscale bar.

4. The method of claim 3, wherein
   the grayscale step of the at least one grayscale bar is represented by a color filled with a predetermined concentration within a rectangular area, a circle, a polygon, or a cross.

5. The method of claim 1, wherein
   the test pattern is one of a distortion evaluation test pattern, a modulation transfer function (MTF) measurement pattern, a color chart pattern, and a full-screen white pattern.

6. The method of claim 1, wherein the generating the hologram measurement pattern by inserting a random phase into the measurement pattern data includes:
   inserting the random phase into the measurement pattern data and converting the measurement pattern data in which the random phase is inserted into a hologram pattern by a computer generated hologram (CGH) generation method; and
   determining a hologram pattern having a minimum difference between a hologram reconstructed image of the hologram pattern and the measurement pattern data as the hologram measurement pattern.

7. The method of claim 1, further comprising:
   converting the hologram measurement pattern into a format of a hologram image file; and
   measuring quality of the holographic display by uploading the holographic image file to a spatial light modulator.

8. The method of claim 7, wherein the converting the hologram measurement pattern into a format of a hologram image file includes
   converting a real number value of a pixel of the hologram measurement pattern into an integer value by performing quantization and normalization on the hologram measurement pattern.

9. The method of claim 7, wherein
   the format of the hologram image file is one of jpg, bmp, png, tif, and tiff.

10. An apparatus for generating a hologram measurement pattern for measuring image quality of a holographic display, the apparatus comprising:
- a test pattern generator configured to generate a test pattern;
- a common pattern generator configured to generate a common pattern including at least two grayscale bar;
- a measurement pattern combiner configured to generate measurement pattern data by combining the common pattern with a frame of the test pattern; and
- a measurement pattern computer generated hologram (CGH) generator configured to generate the hologram measurement pattern by inserting a random phase into the measurement pattern data.

11. The apparatus of claim 10, wherein
the at least two grayscale bar includes a white grayscale bar, and further includes one of a red grayscale bar, a green grayscale bar, and a blue grayscale bar.

12. The apparatus of claim 11, wherein when the measurement pattern combiner generate the measurement pattern data, the measurement pattern combiner combines the white grayscale bar above the test pattern, and combines one of the red grayscale bar, the green grayscale bar, and the blue grayscale bar below the test pattern.

13. The apparatus of claim 10, wherein when the common pattern generator generates the common pattern including at least one grayscale bar, the common pattern generator assigns a three-dimensional (3D) depth value to each grayscale step of the at least two grayscale bar.

14. The apparatus of claim 10, wherein when the test pattern generator generates the test pattern, the test pattern generator generates one of a distortion evaluation test pattern, a modulation transfer function (MTF) measurement pattern, a color chart pattern, and a full-screen white pattern as the test pattern.

15. The apparatus of claim 10, wherein the measurement pattern CGH generator includes:
- a random phase inserting processor configured to insert the random phase into the measurement pattern data;
- a CGH generator configured to convert the measurement pattern data in which the random phase is inserted into a hologram pattern by a computer generated hologram (CGH) generation method; and
- a pattern uniformity verification processor configured to determine a hologram pattern having a minimum difference between a hologram reconstructed image of the hologram pattern and the measurement pattern data as the hologram measurement pattern.

16. An apparatus for measuring quality of a holographic display, the apparatus comprising:
- a memory configured to store a program;
- a processor configured to execute the program to perform:
    - generating measurement pattern data by combining a test pattern with a common pattern including at least one grayscale bar outside the test pattern; and
    - generating a hologram measurement pattern by inserting a random phase into the measurement pattern data; and
- a light measurement device (LMD) configured to measure the quality of the holographic display from a hologram reconstructed image of the hologram measurement pattern.

17. The apparatus of claim 16, wherein the processor is configured to execute the program to further perform converting a real number value of a pixel of the hologram measurement pattern into an integer value by performing quantization and normalization on the hologram measurement pattern, wherein the integer value is mapped to each pixel in an image file corresponding to the hologram measurement pattern.

18. The apparatus of claim 17, wherein a format of the image file is one of jpg, bmp, png, tif, and tiff.

* * * * *